(12) United States Patent
Livingston et al.

(10) Patent No.: US 12,260,784 B2
(45) Date of Patent: *Mar. 25, 2025

(54) TAMPER EVIDENT LABEL FOR ITEMS

(71) Applicant: Iconex LLC, Duluth, GA (US)

(72) Inventors: Timothy Darren Livingston, Corryton, TN (US); Shane Lamb, Bulls Gap, TN (US)

(73) Assignee: Iconex LLC, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,183

(22) Filed: Nov. 16, 2022

(65) Prior Publication Data

US 2024/0161656 A1 May 16, 2024

(51) Int. Cl.
*G09F 3/02* (2006.01)
*B32B 3/26* (2006.01)
(Continued)

(52) U.S. Cl.
CPC .......... *G09F 3/0288* (2013.01); *B32B 3/266* (2013.01); *B32B 7/06* (2013.01); *B32B 7/12* (2013.01);
(Continued)

(58) Field of Classification Search
CPC .. G09F 3/0288; G09F 3/10; G09F 2003/0222; G09F 2003/023;
(Continued)

(56) References Cited

U.S. PATENT DOCUMENTS

| | | | | |
|---|---|---|---|---|
| 4,584,219 A | * | 4/1986 | Baartmans | G09F 3/0288 206/390 |
| 5,484,168 A | * | 1/1996 | Chigot | G09F 3/0288 283/67 |

(Continued)

FOREIGN PATENT DOCUMENTS

| | | |
|---|---|---|
| EP | 3070701 | 9/2016 |
| JP | 3104907 U | * 10/2004 |

(Continued)

OTHER PUBLICATIONS

Machine Translation of JP-3104907-U. (Year: 2004).*
(Continued)

*Primary Examiner* — Patricia L. Nordmeyer
(74) *Attorney, Agent, or Firm* — Schwegman Lundberg & Woessner, P.A.

(57) ABSTRACT

A liner-label combination is provided for a tamper evident label. The combination includes a label substrate and a liner substrate. The label substrate includes label substrate die cuts that define a top portion, a middle portion, and a bottom portion for the label. The liner substrate includes liner substrate die cuts that correspond to the middle portion of the label. The top portion, middle portion, and bottom portion adapted to be separated from the liner substrate as a single label with a backside of the middle portion including the corresponding liner substrate defined by the liner substrate die cuts. The middle portion of the label adapted to cover an opening of an item and when removed from the opening, the middle portion separates from the top portion and the bottom portion along the label substrate die cuts providing evidence that the opening to the item was exposed.

18 Claims, 8 Drawing Sheets

(51) Int. Cl.
    *B32B 7/06*     (2019.01)
    *B32B 7/12*     (2006.01)
    *B32B 37/12*    (2006.01)
    *B32B 38/00*    (2006.01)
    *B65D 25/20*    (2006.01)
    *G09F 3/10*     (2006.01)

(52) U.S. Cl.
    CPC .......... *B32B 37/12* (2013.01); *B32B 38/0004* (2013.01); *B65D 25/205* (2013.01); *G09F 3/10* (2013.01); *B32B 2519/00* (2013.01); *B65D 2401/05* (2020.05); *G09F 2003/0222* (2013.01); *G09F 2003/023* (2013.01); *G09F 2003/0267* (2013.01); *G09F 2003/0273* (2013.01)

(58) Field of Classification Search
    CPC ..... G09F 2003/0267; G09F 2003/0273; B32B 3/266; B32B 7/06; B32B 7/12; B32B 37/12; B32B 38/0004; B32B 2519/00; B65D 25/205; B65D 2401/05
    See application file for complete search history.

(56) References Cited

U.S. PATENT DOCUMENTS

| | | | |
|---|---|---|---|
| 5,506,015 A * | 4/1996 | Frederiksen | A61J 1/18 220/257.1 |
| 5,658,631 A * | 8/1997 | Bernstein | G09F 3/10 283/81 |
| 5,836,622 A | 11/1998 | Fabel | |
| 5,958,536 A * | 9/1999 | Gelsinger | G09F 3/0288 40/310 |
| 6,177,163 B1 * | 1/2001 | Blok | G09F 3/10 156/277 |
| 6,276,725 B1 | 8/2001 | Laurash et al. | |
| 7,758,080 B1 * | 7/2010 | Vidler | B42D 15/00 283/81 |
| 8,568,847 B2 | 10/2013 | Brookshire et al. | |
| 8,889,205 B2 | 11/2014 | Sierra-gomez et al. | |
| 9,592,656 B1 * | 3/2017 | Davies | B32B 37/1292 |
| 2010/0201082 A1 * | 8/2010 | Hart | B32B 27/32 277/654 |
| 2015/0001223 A1 | 1/2015 | Spreck et al. | |
| 2015/0339956 A1 * | 11/2015 | Turner | B32B 7/06 428/40.1 |
| 2016/0163235 A1 * | 6/2016 | Heederik | B65D 1/165 156/247 |
| 2016/0332789 A1 * | 11/2016 | Yerecic | B65D 55/06 |
| 2019/0114946 A1 | 4/2019 | Holyoak et al. | |
| 2020/0126452 A1 | 4/2020 | Shinkle, II et al. | |
| 2021/0061531 A1 | 3/2021 | Pinkstone et al. | |
| 2022/0013041 A1 | 1/2022 | Francoeur et al. | |
| 2024/0161657 A1 | 5/2024 | Livingston et al. | |

FOREIGN PATENT DOCUMENTS

| | | | | |
|---|---|---|---|---|
| JP | 2011170221 A | * | 9/2011 | |
| JP | 2011170222 A | * | 9/2011 | |
| JP | 3194260 | | 10/2014 | |
| WO | 2016204033 | | 12/2016 | |
| WO | 2022077118 | | 4/2022 | |
| WO | WO-2022077118 A1 | * | 4/2022 | .......... G09F 3/0288 |
| WO | 2024107380 | | 5/2024 | |
| WO | WO-2024168258 A2 | | 8/2024 | |

OTHER PUBLICATIONS

Machine Translation of JP-2011170221-A. (Year: 2011).*
Machine Translation of JP-2011170222-A. (Year: 2011).*
"U.S. Appl. No. 18/167,184, Advisory Action mailed Jul. 26, 2024", 3 pgs.
"U.S. Appl. No. 18/167,184, Response filed Aug. 16, 2024 to Advisory Action mailed Jul. 26, 2024", 11 pgs.
"International Application Serial No. PCT/US2024/015191, International Search Report mailed Jul. 17, 2024", 5 pgs.
"International Application Serial No. PCT/US2024/015191, Written Opinion mailed Jul. 17, 2024", 8 pgs.

* cited by examiner

121A

TAMPER EVIDENT LABEL FOR ITEMS

BACKGROUND

Labels are used for a variety of functions. Primarily consumers recognize that labels are useful for packages, such as pre-printed address labels and return labels. Labels are also used in restaurants to properly identify an order by placing a printed label on the food packaging so that staff can confirm the order and properly deliver the order to a customer.

Labels can also be used as security and health safety mechanisms to provide evidence that prepared food was not tampered with between the time it was packaged and delivered to the consumer. For the most part, these type of labels are placed over bag or container openings such that in order to open the bag or container the label is broken. Most of these techniques are often unsuccessful because the labels can be carefully removed, the bag opened, and the labels resealed over the openings of the bags. Thus, consumers have little comfort in such labels and realize that their food may still have been tampered with.

Some containers have seals placed under a cap such that when a cap is removed and the seal is not present, the consumer knows that the contents should not be used as they may have been tampered with. This type of label/seal is frequently used on over-the-counter pharmaceutical products such as acetaminophen, juice, milk, etc. Another approach with some bottled beverages is to integrate a tamper-evident mechanism into the bottle cap itself. For example, a tab is pulled off the cap to open the beverage and a portion of the prefabricated cap is disposed of, and a smaller portion of the cap remains so the consumer can reseal the beverage for storage. Sometimes the throw-away portion remains as a separate component on the neck of the bottle, which is the case for bottled water, sodas, etc. A consumer can visibly discern whether the bottle was opened or not when the separate component is no longer fully integrated into the replaceable cap.

SUMMARY

In various embodiments, tamper evident labels and a method for manufacturing tamper evident labels are provided. Specifically, and in an embodiment, a liner-label combination is provided for a tamper evident label. The combination includes a liner substrate and a label substrate. The label substrate includes first die cuts to define a top portion, a middle portion, and a bottom portion in the label. The liner substrate includes second die cuts corresponding to the middle portion. The label is adapted to be removed from the liner substrate as a single unit with the first die cuts remaining in the label substrate and the second die cuts in the liner substrate separated with the corresponding portion of the liner substrate remaining affixed to a backside of the middle portion. The label includes adhesive on backsides of the top and bottom portions when separated from the liner substrate. The middle portion adapted to be placed over an opening for an item with the top and bottom portions adhered to sides of the item. The first die cuts adapted to tear and separate the middle portion from the top and bottom portions when the middle portion is removed from the opening of the item providing evidence that the opening to the item was exposed.

DETAILED DESCRIPTION

Figure 1:
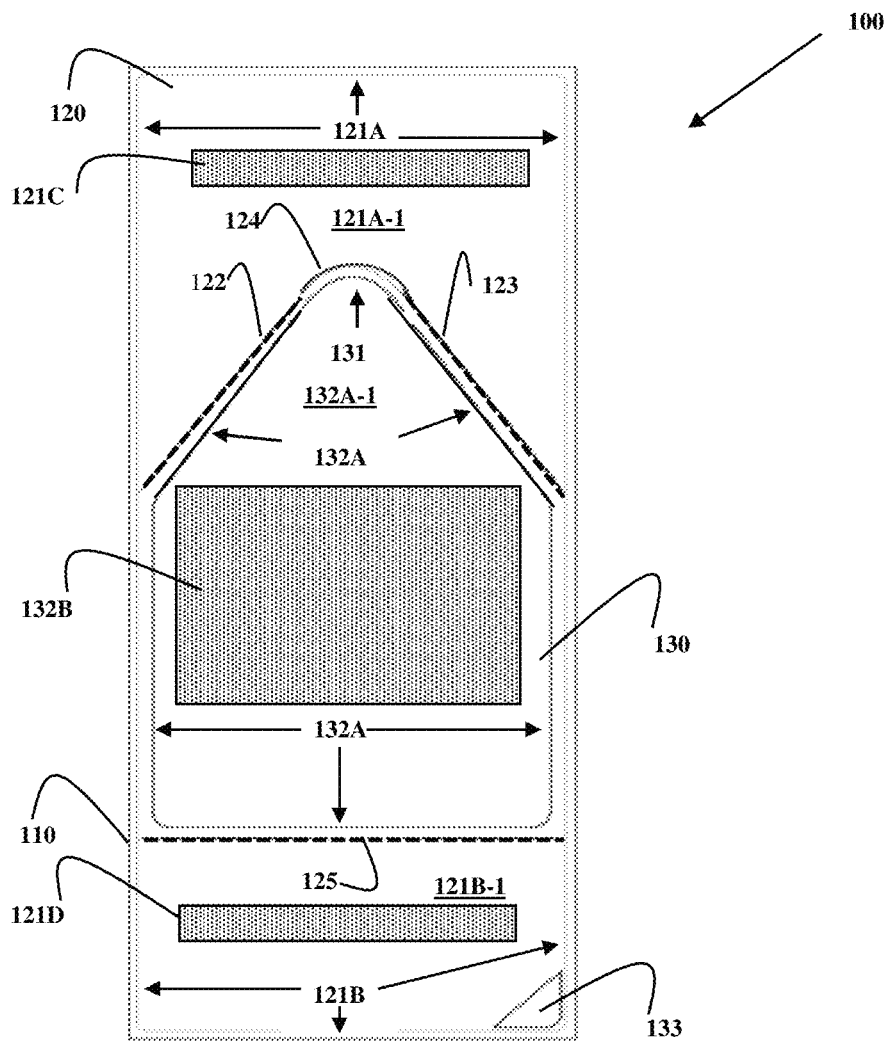
FIG. 1 is a diagram of a front side of a liner-label combination for a tamper evident label, according to an example embodiment.

As stated above, labels are used for a variety of purposes. Yet, there appears to be very few label solutions for beverage cups or containers that do not come with premanufactured caps or lids. These type of beverages are typically served for immediate consumption by consumers at fast food restaurants, regular sit-down restaurants, coffee shops, bars, etc. These types of beverages are susceptible to contamination, since from the time they are poured until the time they are delivered to the consumer, the liquid in the cup is exposed through the opening. This is particularly a problem in bars because of the trend where nefarious individuals have been known to slip drugs into drinks of customers.

Moreover, after COVID19 consumers are more health conscious about how their food is prepared and delivered. Consumers want assurances and piece of mind that prepackaged and delivered food and drink are free of contamination and safe for their consumption.

These issues are solved with the tamper evident label provided herein and below. A liner-label combination is provided when the tamper evident label is peeled away from the liner for application a portion of the liner remains adhered to a removable portion of the tamper evident label. The removed tamper evident label includes three portions that separate from the liner as a single unit. A top and bottom portion of the tamper evident label include no liner material and have adhesive retained on their backsides; a middle portion includes the portion of the liner material that remains attached to the tamper evident label. The tamper evident label is sized such that the middle portion is sufficiently wide enough to fit over a variety of beverage openings for typical beverage cups, bar glasses, and/or drinking glasses. The adhesive on the backsides of the top and bottom portions allows the tamper evident label to be placed over the opening of the beverage with the liner portion and non-adhesive backside of the middle portion covering the opening and the top and bottom portions pulled down and adhered to two sides of the beverage cup or container.

The middle portion also includes a tab that is flared up such that a consumer can grasps the tab and pull the middle portion off the beverage opening. Two weakened perforations that taper from the tab to the edges of the tamper evident label are broken when the tab is pulled up by the consumer, which provides visible evidence that the middle portion was removed from the beverage opening. The is no adhesive material on the backside of the middle portion, since the middle portion's backside includes the attached liner, and the backside of the liner is adhesive free. Moreover, the middle portion tears away from the top and bottom portions preventing it from being reassembled and reattached and thereby providing tamper evident evidence that the opening to an item was tampered with once the middle portion is removed from the opening. The consumer knows whether the beverage was tampered with if the middle portion is removed or if any attempt to reseal the middle portion took place based on the tears that separated along the weakened perforations.

In an embodiment, a bottom corner of the bottom portion of the tamper evident label also includes a tab that is die cut both through the label substrate and the liner substrate. This provides an adhesive-free tab with liner attached to separate the tamper evident label from the liner.

In an embodiment, a front side surface of the label substrate can include a print or image coating, such as a thermal coating or a coating that permits dot matrix printing or label printing. The liner-label combination is processed through a terminal printer, dot matrix printer, and/or laser printer for purposes of providing custom indicia on a front side of the tamper evident label. The custom indicia label is separated from the liner via the bottom portion tab and the middle portion centered over a beverage opening where the adhesive on the backside of the bottom and top portions are pulled down and adhered to sides of the beverage.

In an embodiment, the tamper evident label is also useful for sealing other items beyond just beverage openings, such as food bowls or other prepared food items. In an embodiment, the tamper evident label seals to sides of a confidential folder together such that the only manner in which the two sides can be separated and opened is by removing the middle portion via its tab as was discussed above.

The above-discussed embodiments are now discussed with reference to the FIGS. 1-8. FIG. 1 is a diagram of a front side of a liner-label combination 100 for a tamper evident label 120 and 130, according to an example embodiment. The liner-label combination 100 includes a liner or liner substrate 110 and a removable tamper evident label 120 and 130 or label substrate.

The tamper evident label 120 and 130 includes three components all of which are separated together as a single tamper evident label 120 and 130 when peeled away from the liner 110. The three components or portions of the tamper evident label 120 and 130 include a top portion 121A-1 defined by edges 121A, 122, 123, and 124. The middle portion 132A-1 is defined by edges 131 and 132A and the bottom portion 121B-1 is defined by edges 121B and 125. The bottom portion 121B-1 also includes tab 133.

The top portion 121A-1, middle portion 132A-1, and bottom portion 121B-1 with tab 133 are peeled away from liner 110 by grasping tab 133 and pulling a backside of the tamper evident label 120 and 130 off a front side of liner 110.

In an embodiment, the top portion 121A-1 includes a thermal sensitive image/print coating or layer 121C deposited on a front side of the top portion 121A-1. In an embodiment, the middle portion 132A-1 includes a thermal sensitive image/print coating or layer 132B deposited on a front side of the middle portion 132A-1. In an embodiment, the bottom portion 121B-1 includes a thermal sensitive image/print coating or layer 121D deposited on a front side of the bottom portion 121B-1. In an embodiment, the image/print coating or layer 121C, 132B, and 121D is a dot matrix or laser print coating. In an embodiment, the image/print coating or layer 121C, 132B, and 121D can be deposited on just one of, all of, or any combination of the top portion 121A-1, the middle portion 132A-1, and the bottom portion 121B-1.

Tab 133 is die cut through both the label substrate and the liner substrate. Tab 133 can flare upward or be pushed to flare upward where a user can grasp tab with a thumb and finger and separate the tamper evident label 120 and 130 from liner 110. The tab component 133 is handled without any adhesive as an operator's digit grasps the front side of the label substrate and another one of the operator's digit grasps the backside of the liner substrate, which is free of any adhesive coating.

Figure 2A:
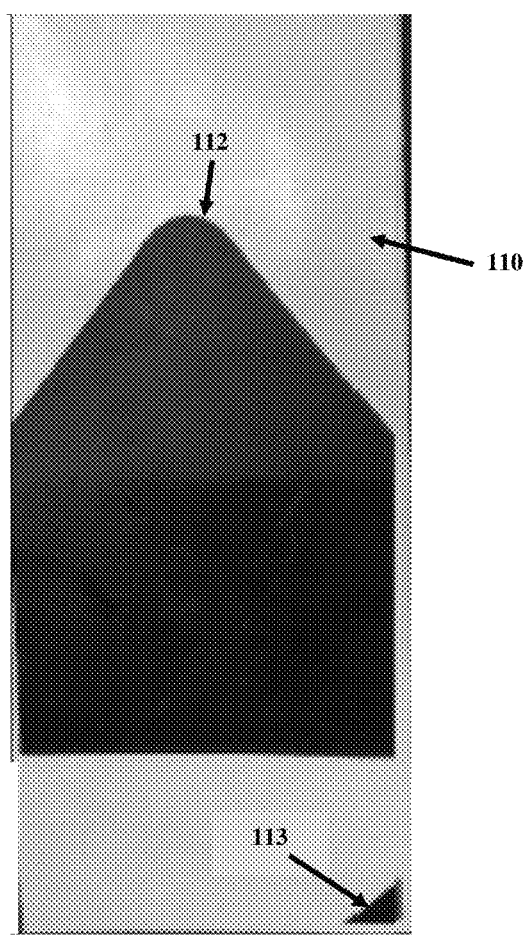
FIG. 2A is a diagram of a liner after a tamper evident label has been removed from the liner-label combination, according to an example embodiment.

FIG. 2A is a diagram of a liner 110 after a tamper evident label 120 and 130 has been removed from the liner-label combination 100, according to an example embodiment. Two holes 112 and 113 remain in the liner substrate that corresponds to the middle portion 132A-1 and tab 133, respectively.

The middle portion 132A-1 includes both its corresponding label substrate and liner substrate (e.g., the portion of the liner substrate that left hole 112 when the tamper evident label 120 and 130 was separated from liner 110). The backside of the liner 110 that corresponds to the middle portion 132A-1 is adhesive free such that it can be placed over an opening of a beverage cup, glass, container and removed by a consumer without leaving any adhesive residue around the edges or the opening.

Figure 2B:
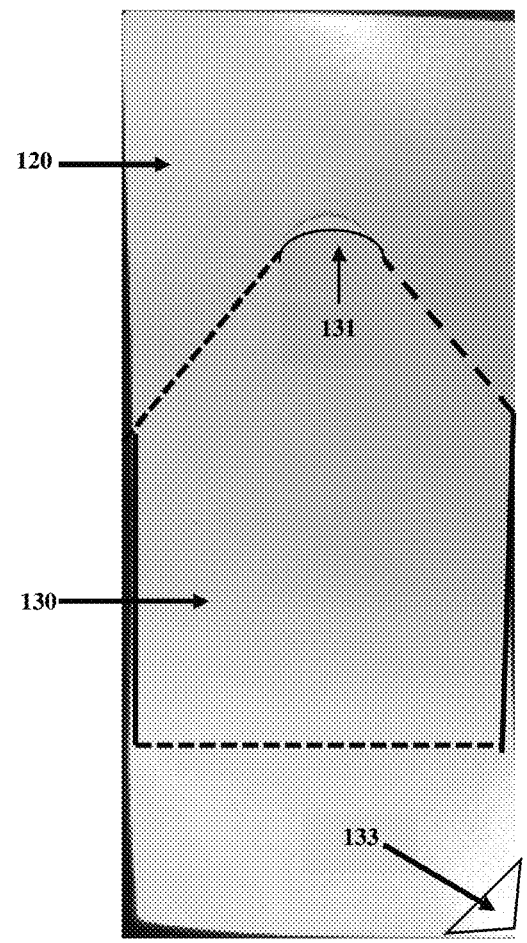
FIG. 2B is another diagram of a front side of a liner-label combination for a tamper evident label, according to an example embodiment.

FIG. 2B is another diagram of a front side of a liner-label combination 100 for a tamper evident label 120 and 130, according to an example embodiment. FIG. 2B illustrates the dotted lines that define the middle portion 132A-1 as die cuts made in the label substrate whereas the solid lines of the top tab 131 and the bottom tab 133 illustrate die cuts made in both the label substrate and the liner substrate. Underneath the dotted lines are die cuts 132A (not visible in FIG. 2B) that are made through the liner substrate, as illustrated in FIG. 1.

Figure 3:
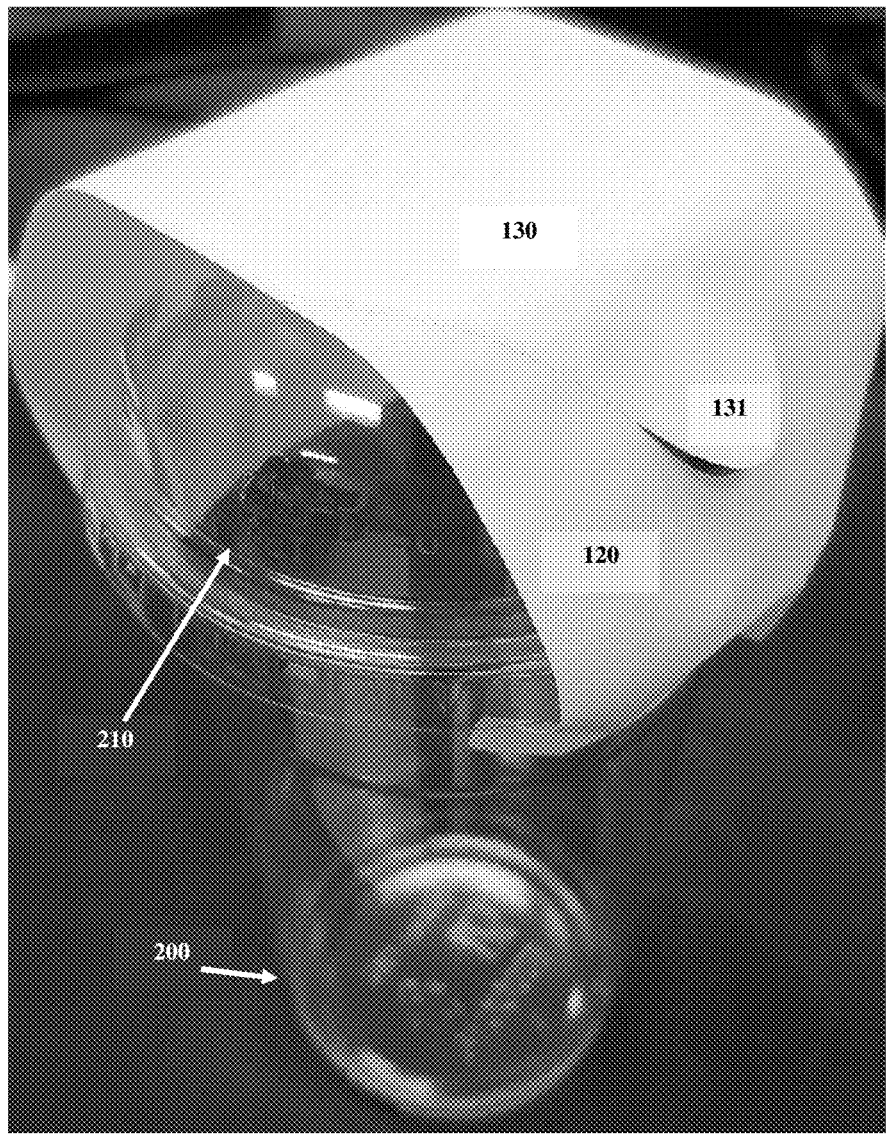
FIG. 3 is a diagram of a tamper evident label sealed over an opening of a beverage cup, according to an example embodiment.

FIG. 3 is a diagram of a tamper evident label 120 and 130 sealed over an opening of a beverage cup 200, according to an example embodiment. Once tamper evident label 120 and 130 is removed from the liner 110 it is placed over an opening of a beverage cup 200. The beverage cup 200 can include a lid 210. The opening of the lid 210 is completely covered by the middle portion 132A-1 of the tamper evident label 120 and 130. The backside of the middle portion 132A-1 includes the corresponding portion of the liner 110 that corresponds to hole 112 in FIG. 2A.

Tab 131 is flared up or slightly raised such that it can be grasped by a consumer and peeled off the opening along die cuts 122, 123, and 132A. Tab 131 flares up because it is die cut through both the label and line substrate such that when top portion 121A-1 and bottom portion 121B-1 are pulled down with middle portion 132A-1 over the opening of cup 200, tab 131 lifts up and separates from both the liner substrate and the label substrate.

Figure 4:
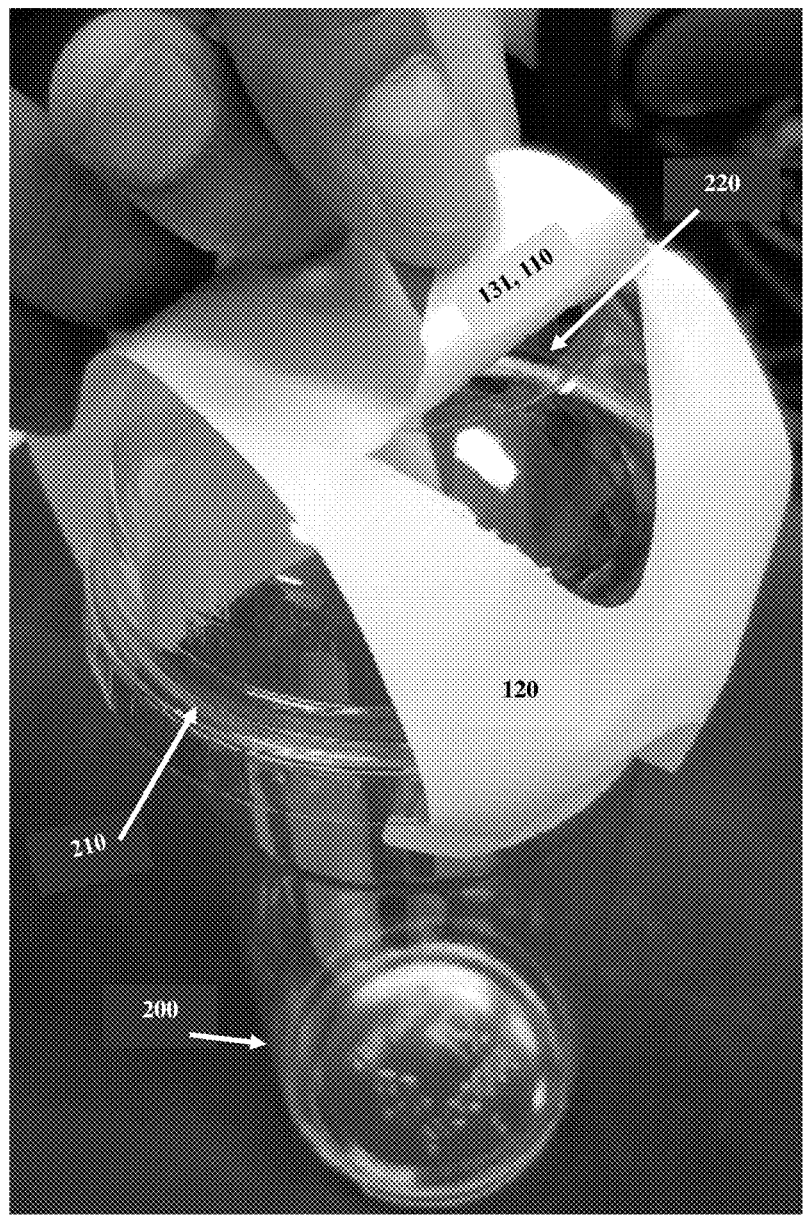
FIG. 4 is a diagram of the tamper evident label being peeled away from an opening of the beverage cup, according to an example embodiment.

FIG. 4 is a diagram of the tamper evident label 120 and 130 being peeled away from an opening 220 of the beverage cup 200, according to an example embodiment. The backside of liner 110 is visible as tab 131 is lifted and the middle portion 132A-1 is separated from the tamper evident label 120 and 130. This is the backside of liner 110 and is adhesive free as is the same for the entire backside of the middle portion 132A-1. Thus, no adhesive residue remains on the rim of lid 210 when the consumer drinks the beverage from the opening 220.

Figure 5:
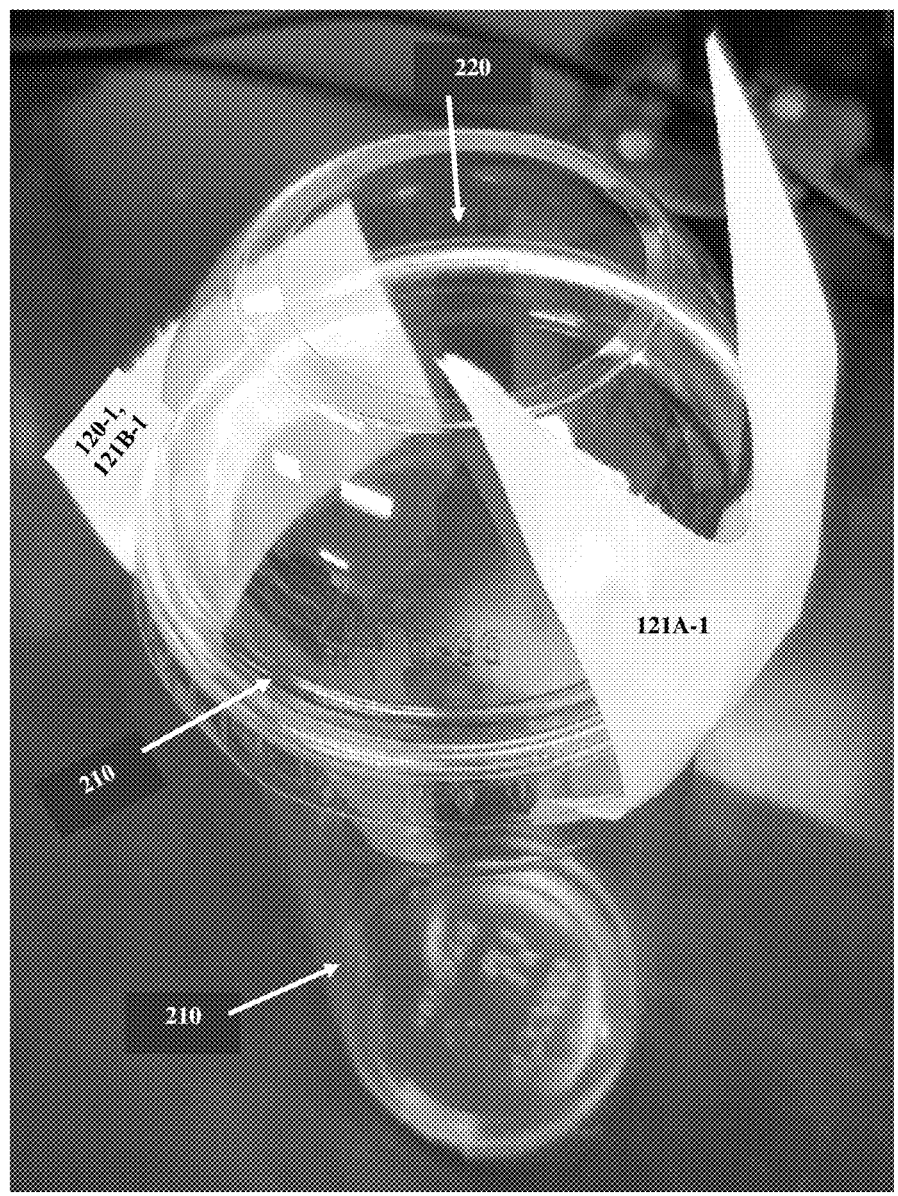
FIG. 5 is a diagram of an exposed and label-free opening of the beverage container after a portion of the temper evident label is peeled off and remaining portions of the tamper evident label remains adhered to sides of the beverage cup, according to an example embodiment.

FIG. 5 is a diagram of an exposed and label-free opening 220 of the beverage container 210 after a middle portion 132A-1 of the tamper evident label 120 and 130 is peeled off and remaining portions 121A-1 and 121B-1 of the tamper evident label 120 and 130 remains adhered to sides of the beverage cup 200, according to an example embodiment. A backside 120-1 of the bottom portion 121B-1 is visible, the backsides of both the bottom portion 121B-1 and top portion 121A-1 include adhesive ensuring that the tamper evident label 120 and 130 seals the opening of the cup 210 as shown in FIG. 3 until the middle portion 132A-1 is removed as shown in FIG. 5.

Because die cuts 122 and 123 extend to the sides 121A and 121B in the label substrate, the middle portion 132A-1 tears and separates from top portion 121A-1 and bottom portion 121B-1. Moreover, since there is no adhesive on the backside of middle portion 132A-1 because of the accompanying liner 110 with a separated middle portion 132A-1, the middle portion 132A-1 is not capable of resealing the opening 220. Die cut 125 in the label substrate also ensures that the middle portion 132A-1 completely separates from both the top portion 121A-1 and the bottom portion 121B-1 with both the top portion 121A-1 and the bottom portion 121B-1 remaining adhered to the cup 200. Thus, once middle portion 132A-1 is removed and the opening 220 exposed for cup 200 it cannot be replaced, and the consumer has evidence that their beverage was potentially exposed after it was initially poured into cup 200 and sealed with the tamper evident label 120 and 130. Accordingly, die cuts 122, 123, and 125 provide tamper evident features for label 120 and 130.

Figure 6:
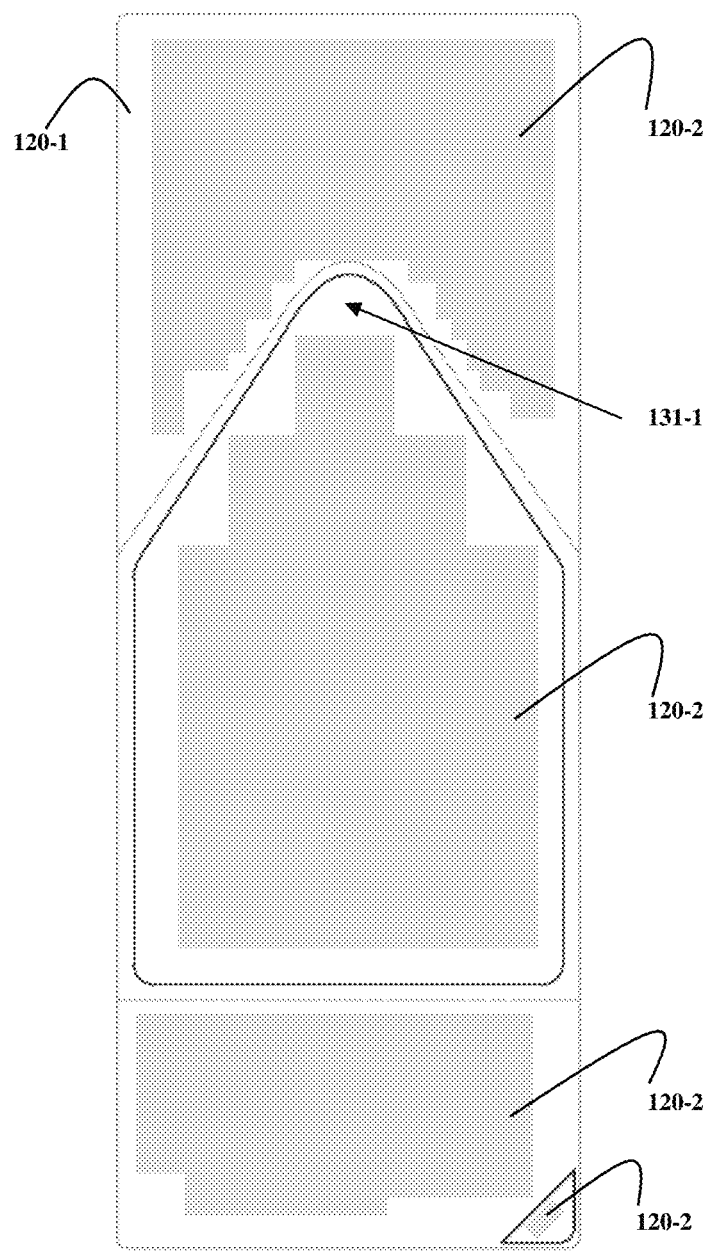
FIG. 6 is a diagram of a backside of a tamper evident label, according to an example embodiment.

FIG. 6 is a diagram of a backside of a label substrate for a tamper evident label 120 and 130, according to an example embodiment. Adhesive 120-2 can be applied uniformly or in patches in areas of the top portion 121A-1, the bottom portion 121B-1, the middle portion 132A-1, and bottom tab portion 133. The adhesive 120-2 ensures that the backside 120-1 adheres to a front side of the liner 110.

Figure 7:
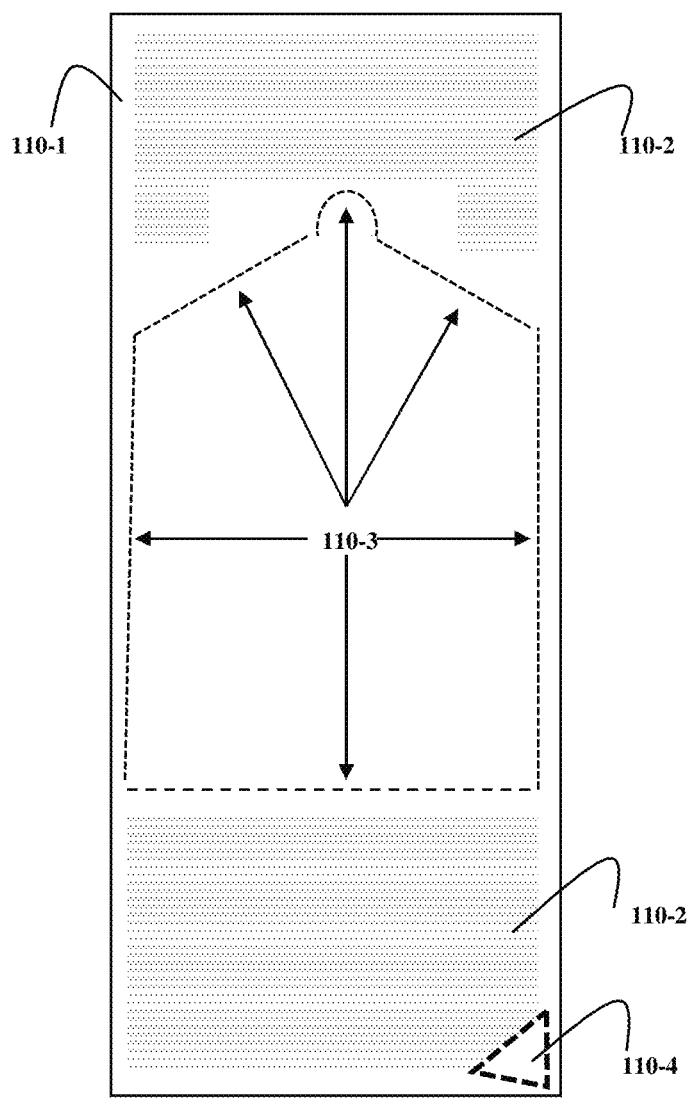
FIG. 7 is a diagram of a front side of a liner in the liner-label combination according to an example embodiment.

FIG. 7 is a diagram of a front side 110-1 of a liner 120 in the liner-label combination 100 according to an example embodiment. A release coating 110-2 is applied to the front side 110-1 that corresponds to the top portion 121A-1 and the bottom portion 121B-1 of the backside 120-1 of the tamper evident label 120 and 130. The front side 110-1 that corresponds to the middle portion 132A-1 and the bottom tab 133 is devoid of any release coating. This ensures that there is structural strength from the adhesive 120-2 on the backside 120-1 of the middle portion 132A-1 to the front side of liner 110-1 such that the liner substrate die cuts 110-3 separates the middle portion 132A-1 with the corresponding liner portion still attached to a backside 120-1 of the middle portion 132A-1. Similarly, die cuts 110-4 in the liner substrate is devoid of any release coating allowing the front side 110-1 corresponding to tab 133 to remain attached via adhesive 120-2 to the backside 120-1 of tamper evident label 120 and 130 and allowing tab 133 to be used to peel backside 120-1 of tamper evident label 120 and 130 off of the front side 110-1 of the liner with holes 112 (for the middle portion 132A-1) and 113 (for tab 133) remaining in liner 110.

It is to be noted that although a disposable cup 200 was illustrated in FIGS. 3-5, the embodiments of the tamper evident label 120 and 130 can include other types of cups, glasses, and bowls that include an opening from which a beverage or food is accessible to a consumer. Additionally, tamper evident label 120 can be used with non-food items such as file folders or packages. The tamper evident label 120 can include customized sizes and dimensions to accommodate different sized openings in beverage or bowl containers.

In an embodiment, a roll of liner-label combinations 110 is provided in a web or roll with a plurality of individual tamper evident labels 120 and 130. The roll is fed to a printer for thermal imaging or printing of customized indicia for each individual tamper evident label 120 and 130.

In an embodiment, the tamper evident labels 120 and 130 are applied to bar drinks at a bar by a bartender after a drink is prepared for a patron. This ensures the patron that no one was able to drop anything nefarious into the drink before the drink reaches the patron for consumption.

In an embodiment, the tamper evident labels 120 and 130 are applied to fast food, restaurant, and coffee shop beverages. The front side of the labels 120 and 130 can be imaged or printed with custom indicia indicating the order number of the customer and the type of drink. Additionally, the middle portion 132A-1 can be imaged or printed with custom indicia for promotional offers. The consumer removes the middle portion 132A-1 to drink the beverage and can retain the promotional offer for subsequent use. The middle portion 132A-1, the top portion 121A-1, and/or the bottom portion 121B-1 can be thermal imaged or printed with custom indicia for advertisements of retailers and viewing by the consumer.

In an embodiment, any advertisements or promotional offers can be pre-printed or pre-imaged on the tamper evident label 120 and 130 with another portion custom thermal imaged or printed with custom indicia by a printer using one or more thermal, dot matrix, or laser coatings 121A, 132B, and/or 121D.

Figure 8:
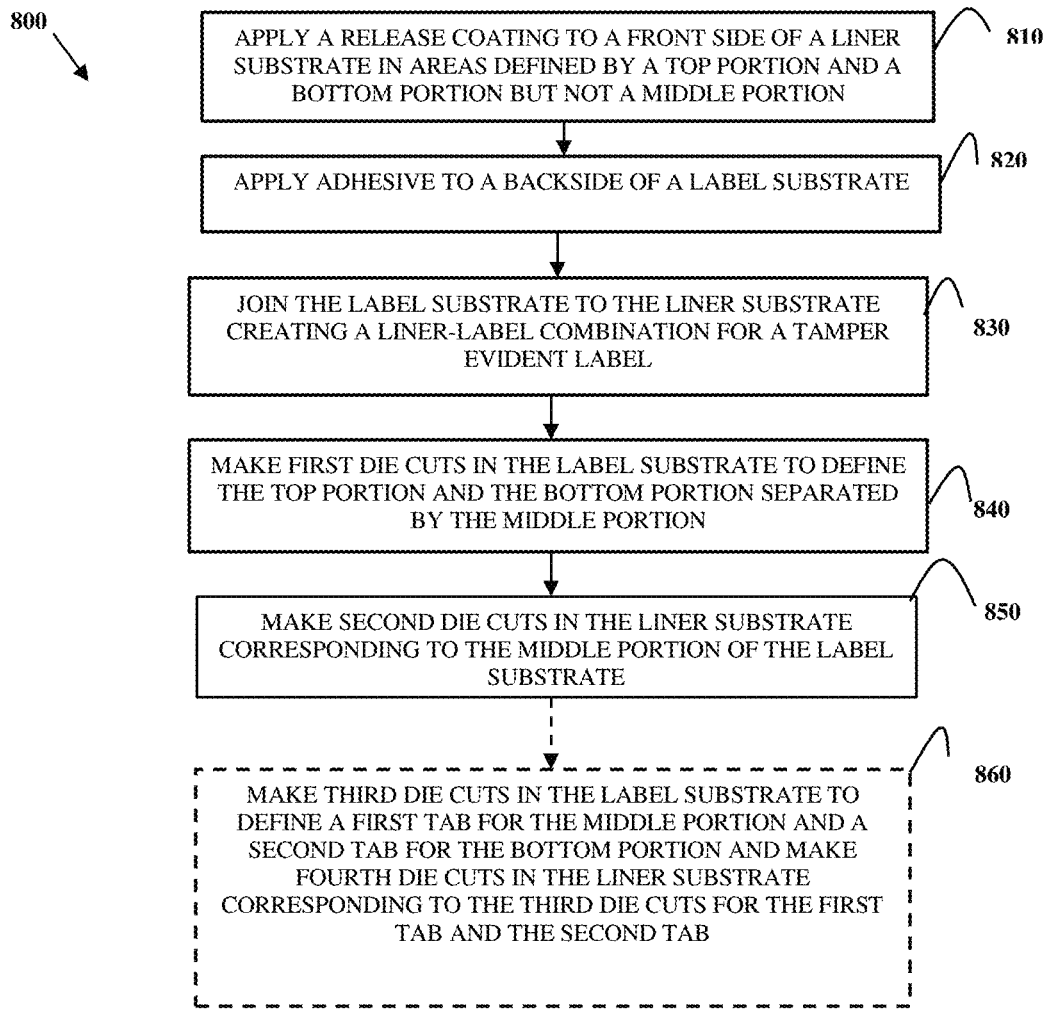
FIG. 8 is a diagram of a method of manufacturing the liner-label combination for a tamper evident label, according to an example embodiment.

FIG. 8 is a diagram of a method of manufacturing the liner-label combination 100 for a tamper evident label 120 and 130, according to an example embodiment. The method is implemented on a press through firmware that controls electro-mechanical components of the press to manufacture a label-liner combination 110 with a tamper evident label 120 and 130 as described herein and above. A processor associated with the firmware executes the firmware to perform the method and to control the electromechanical components of the press.

At 810, the press applies a release coating 110-2 to a front side of a liner substrate 110-1 in areas defined by a top portion 121A-1 and a bottom portion 121B-1 but not in other areas that correspond to a middle portion 132A-1. This allows the middle portion 132A-1 to remain adhered to the corresponding portion of the liner substrate 110 while the top portion 121A-1 and bottom portion 121B-1 separate from the liner substrate 110 when the label substrate 120 is peeled off the liner substrate 110 creating a hole 112 in the liner substrate 110 in an area that corresponds to the middle portion 132A-1

At 820, the press applies adhesive 120-2 to a backside 120-1 of a label substrate 120. The adhesive 120-2 can be applied uniformly to the backside 120-1 or applied in patterns and/or patches. In an embodiment, the adhesive 120-2 is a microsphere adhesive that is adapted to adhere to wet surfaces.

At 830, the press joins the label substrate 120 to the liner substrate 110. This creates a liner-label combination 100 for a tamper evident label 120.

At 840, the press makes first die cuts 122, 123, 124, and 125 in the label substrate 120 to define the top portion 121A-1 in the label substrate 120 and the bottom portion 121B-1 in the label substrate 120. The top portion 121A-1 in the label substrate 120 and the bottom portion 121B-1 in the label substrate 120 separated by the middle portion 132A-1 of the label substrate 120.

At 850, the press makes second die cuts 131 and 132A in the liner substrate 110 corresponding to the middle portion 132A-1 of the label substrate 120. The second die cuts 131 and 132A outline the middle portion 132A-1 in the label substrate 120 under the top portion 121A-1 of the label substrate 120 and above the bottom portion 121B-1 of the label substrate 120.

In an embodiment, at 850, the press makes third die cuts in the label substrate to define a first tab 131 for the middle portion 132A-1 and a second tab 133 for the bottom portion 121B-1. The press further makes fourth die cuts in the liner substrate corresponding to the third die cuts 124 for the first tab 131 and the second tab 133.

In an embodiment, a front side of the label substrate 120 is precoated with a thermal activated image or print coating 121C, 132B, and/or 121D. In an embodiment, the thermal activated image or print coating 121C, 132B, and/or 121D is applied or deposited on the front side of the label substrate 120 by the press. The coating 121C, 132B, and/or 121D can be applied to just one of, all of, or some combination of the first portion 121A-1, the middle portion 132A-1, and/or the bottom portion 121B-1.

Although the present invention has been described with particular reference to certain preferred embodiments thereof, variations and modifications of the present invention can be affected within the spirit and scope of the following claims.

The invention claimed is:

1. A liner-label combination, comprising:
    a label substrate with first die cuts that define a top portion, a middle portion, and a bottom portion; and
    a liner substrate with second die cuts that correspond to the middle portion;
    wherein the top portion, the middle portion, and the bottom portion adapted to be separated from the liner substrate as a single unit representing a tamper evident label with the middle portion comprising the corresponding liner substrate remaining attached to a backside of the middle portion;
    wherein the middle portion of the tamper evident label adapted to be placed over an opening of an item with the top portion and the bottom portion adhered to sides of the item;
    wherein the middle portion is adapted to be separated from the top portion and bottom portion when peeled away from the opening providing evidence that the opening was exposed and providing access to the opening;
    wherein the liner-label combination includes at least one tab that is flared up permitting the at least one tab to be grabbed pulled up and removal of the middle portion when the liner-label combination is adhered to the item via the top portion and the bottom portion;
    wherein the label substrate further includes a print or image coating on a front side of the top portion, the middle portion, and the bottom portion, wherein the print or the image coating is a thermal coating or a coating that permits dot matrix printing or label printing
    wherein an adhesive on backsides of the top portion and the bottom portion is a microsphere adhesive that is adapted to adhere to wet surfaces.

2. The liner-label combination of claim 1, wherein the label substrate further includes third die cuts that outline a first tab, and the liner substrate further includes fourth die cuts that correspond to the first tab, wherein the first tab is adjacent to a bottom center of the top portion and part of the middle portion.

3. The liner-label combination of claim 2, wherein the label substrate further includes fifth due cuts that outline a second tab, and the liner substrate further includes sixth dies cuts that correspond to the second tab, wherein the second tab is adjacent to a bottom side of the bottom portion and is part of the bottom portion.

4. The liner-label combination of claim 1, wherein a backside of the label substrate includes an adhesive coating.

5. The liner-label combination of claim 4, wherein a front side of the liner substrate includes a release coating in areas corresponding to the top portion and the bottom portion but not in other areas corresponding to the middle portion.

6. The liner-label combination of claim 1, wherein the first die cuts include a first side die cut that extends from a center bottom of the top portion diagonally to a first bottom side of the top portion and a second side die cut that extends from a center bottom of the top portion diagonally to a second side bottom of the top portion.

7. The liner-label combination of claim 6, wherein the first die cuts further include a third die cut across the label substrate at a top of the bottom portion.

8. The liner-label combination of claim 1, wherein the second die cuts are adjacent to and under each of the first die cuts within the liner substrate.

9. The liner-label combination of claim 1, wherein the first die cuts comprise three separate die cuts within the label substrate, wherein the three separate die cuts are discontinuous die cuts from one another.

10. The liner-label combination of claim 9, wherein the second die cuts comprise single continuous die cuts within the liner substrate adjacent to a first side of the label substrate, a second side of the label substrate, beneath a bottom of the top portion, and above a top of the bottom portion.

11. The liner-label combination of claim 1, wherein the middle portion includes a tab situated at a top center of the middle portion and corresponding to a portion of the first die cuts and a portion of the second die cuts.

12. The liner-label combination of claim 1, wherein the bottom portion includes a tab situated at a side bottom corner of the bottom portion and corresponding to a portion of the first die cuts and a portion of the second die cuts.

13. A tamper-evident label, comprising:
    a top portion of a label substrate defined by first die cuts in the label substrate;
    a bottom portion of the label substrate defined by second die cuts in the label substrate; and
    a middle portion of the label substrate under the top portion and above the bottom portion, wherein the middle portion defined by third die cuts in a liner substrate;
    wherein the tamper-evident label adapted to be separated from the liner substrate as a single unit with the middle portion comprising a corresponding portion of the label substrate remaining attached to a backside of the middle portion;
    wherein the tamper-evident label adapted to be adhered to sides of an item via backsides of the top portion and the bottom portion with the middle portion over an opening for the item to seal the opening;

wherein the middle portion is adapted to be separated from the top portion and the bottom portion to provide evidence that the opening was exposed and to provide access to the opening of the item;

wherein the tamper-evident label includes at least one tab that is flared up permitting the at least one tab to be grabbed pulled up and removal of the middle portion when the tamper-evident label remains adhered to the item via the top portion and the bottom portion;

wherein the label substrate further includes a print or image coating on a front side of the top portion, the middle portion, and the bottom portion, wherein the print or the image coating is a thermal coating or a coating that permits dot matrix printing or label printing;

wherein an adhesive on the backsides of the top portion and the bottom portion is a microsphere adhesive that is adapted to adhere to wet surfaces.

14. The tamper-evident label of claim 13, wherein the item is a beverage container, a food bag, a food package, or a confidential file.

15. The tamper-evident label of claim 13, wherein the middle portion includes a tab situated at a top center of the middle portion for adhesive free removal of the middle portion from the opening of the item.

16. The tamper-evident label of claim 13, wherein the bottom portion includes a tab situated at a bottom corner of the bottom portion for adhesive free removal of the label substrate from the liner substrate.

17. The tamper-evident label of claim 13, wherein first portions of the first die cuts extend from a top center of the middle portion diagonally to sides of the label substrate.

18. The tamper-evident label of claim 17, wherein bottom portions of the first die cuts extend along a bottom of the middle portion across the label substrate along a top of the bottom portion.

* * * * *